(12) United States Patent
Szabo et al.

(10) Patent No.: US 11,724,229 B2
(45) Date of Patent: Aug. 15, 2023

(54) PROCESS AND PLANT FOR REMOVING DISRUPTIVE COMPONENTS FROM RAW SYNTHESIS GAS

(71) Applicant: L'Air Liquide, Société Anonyme pour l'Etude et l'Exploitation des Procédés Georges Claude, Paris (FR)

(72) Inventors: Robert Szabo, Frankfurt am Main (DE); Sophia Schmidt, Frankfurt am Main (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 114 days.

(21) Appl. No.: 17/362,194

(22) Filed: Jun. 29, 2021

(65) Prior Publication Data

US 2021/0402347 A1 Dec. 30, 2021

(30) Foreign Application Priority Data

Jun. 29, 2020 (EP) .................................... 20020304

(51) Int. Cl.
*B01D 53/14* (2006.01)
*B01D 53/18* (2006.01)
(Continued)

(52) U.S. Cl.
CPC ..... *B01D 53/1425* (2013.01); *B01D 53/1462* (2013.01); *B01D 53/18* (2013.01);
(Continued)

(58) Field of Classification Search
CPC ........ B01D 53/14; B01D 53/18; B01D 53/78; B01D 53/62; C10K 1/005; C10K 1/08
See application file for complete search history.

(56) References Cited

U.S. PATENT DOCUMENTS 3,823,222 A 7/1974 Benson
4,372,925 A 2/1983 Cornelisse
(Continued)

FOREIGN PATENT DOCUMENTS

CN 106000000 A * 10/2016
DE 10 2005 059 101 6/2007
(Continued)

OTHER PUBLICATIONS

European Search Report for corresponding EP 20020304, dated Dec. 3, 2020.
(Continued)

*Primary Examiner* — Sharon Pregler
(74) *Attorney, Agent, or Firm* — Elwood L. Haynes

(57) ABSTRACT

The invention relates to a process and plant for purifying a raw synthesis gas containing hydrogen and carbon monoxide as target components and carbon dioxide and sulfur components as disruptive components by gas scrubbing with a physically acting, liquid scrubbing medium selective for carbon dioxide and sulfur components. The process/the plant comprise an absorption apparatus, a hot regeneration apparatus, a preferably multistage flash regeneration apparatus and a reabsorber column supplied with the first portion of a stripping gas. According to the invention the flash regeneration apparatus is supplied with the second portion of the stripping gas.

14 Claims, 2 Drawing Sheets

(51) Int. Cl.
*C10K 1/00* (2006.01)
*C10K 1/08* (2006.01)

(52) U.S. Cl.
CPC .............. *C10K 1/004* (2013.01); *C10K 1/005* (2013.01); *C10K 1/08* (2013.01); *B01D 2252/2021* (2013.01); *B01D 2256/16* (2013.01); *B01D 2256/20* (2013.01); *B01D 2257/30* (2013.01); *B01D 2257/504* (2013.01)

(56) References Cited

U.S. PATENT DOCUMENTS

| 5,067,972 | A | 11/1991 | Hemmings et al. |
| 2007/0134148 | A1 | 6/2007 | Gubrinski et al. |
| 2010/0104490 | A1* | 4/2010 | Bouillon ............ B01D 53/1462 423/232 |
| 2016/0250590 | A1* | 9/2016 | Raynal .................. B01D 53/18 423/228 |
| 2021/0403822 | A1* | 12/2021 | Gubrinski .......... B01D 53/1493 |

FOREIGN PATENT DOCUMENTS

| DE | 10 2009 015 368 | 9/2010 |
| EP | 3 539 641 | 3/2018 |
| EP | 3 583 994 | 12/2019 |
| WO | WO 2014 175337 | 10/2014 |
| WO | WO 2017 196620 | 11/2017 |
| WO | WO 2019 174787 | 9/2019 |

OTHER PUBLICATIONS

Ullmann's Encyclopedia of Industrial Chemistry, Physical absorption processes, 6th ed. vol. 15, 399-407.
European Search Report for related EP 20020303, dated Dec. 1, 2020.

* cited by examiner

PROCESS AND PLANT FOR REMOVING DISRUPTIVE COMPONENTS FROM RAW SYNTHESIS GAS

CROSS REFERENCE TO RELATED APPLICATIONS

This application claims priority to EP 20020304, filed Jun. 29, 2020, the entire contents of which are incorporated herein by reference.

BACKGROUND

Field of the Invention

The invention relates to a process and plant for purifying a raw synthesis gas containing hydrogen and carbon monoxide as target components and carbon dioxide and sulfur components as disruptive components by gas scrubbing with a physically acting, liquid scrubbing medium selective for carbon dioxide and sulfur components.

Prior Art

Processes for separation of undesired concomitants from industrial crude gases by physical or chemical absorption or gas scrubbing are well-known from the prior art. Thus such processes may be used to safely remove down to trace amounts unwanted, acidic constituents of raw synthesis gases produced by gasification or reforming of carbon-containing inputs, for example carbon dioxide ($CO_2$) and hydrogen sulfide ($H_2S$) but also further constituents such as carbonyl sulfide (COS) and hydrogen cyanide (HCN), from the wanted synthesis gas constituents, i.e. the target components hydrogen ($H_2$) and carbon monoxide (CO). A known and often employed process is the Rectisol process which is described in principle in Ullmann's Encyclopedia of Industrial Chemistry, 6th Ed. Vol. 15, p. 399 et seq. In the Rectisol process the uptake of the abovementioned unwanted disruptive components is effected by cold methanol, i.e. methanol cooled significantly below ambient temperature, as an absorbent or scrubbing medium, wherein intensive mass transfer between the crude gas and the absorption medium/scrubbing medium takes place in an absorber column, also known as a scrubbing column. The solubility of the unwanted gas constituents increases drastically with decreasing temperature of the methanol and increasing pressure while remaining practically constant for hydrogen and carbon monoxide. Methanol additionally has the advantage of still retaining a low viscosity and thus good mass and heat transfer properties even at temperatures down to −75° C.

The methanol laden with the disruptive components and used as scrubbing medium is circulated through regeneration apparatuses in the Rectisol process. In the regeneration apparatuses the laden methanol is freed from the absorbed gases by physical means. Thus in a first regeneration step $CO_2$ is removed from the laden methanol scrubbing medium by decompression (so-called flash regeneration) and/or stripping with a gas, for example nitrogen. In a further or alternative regeneration step the sulfur-containing gases, COS and $H_2S$, are driven off by heating (so-called hot regeneration). It is often sought to produce a virtually $CO_2$-free COS/$H_2S$ gas since economic further processing thereof is impaired by mixing with $CO_2$.

In the Rectisol process a distinction is made between the standard process and the selective Rectisol process. In the standard Rectisol process the concomitant gases COS/$H_2S$ and the $CO_2$ are removed from the raw synthesis gas together in one absorption step. By contrast, in the so-called selective Rectisol process the sulfur-containing concomitant gases COS/$H_2S$ and the $CO_2$ are respectively removed from the raw synthesis gas in separate consecutive absorption steps. This selective absorption is achieved by suitable adjustment of the process parameters, in particular the quantity ratio of scrubbing medium and gas to be absorbed. The advantage of selective absorption is that the COS/$H_2S$ and the $CO_2$ gas are already kept very largely separate in the absorption and only the smaller portion requires separation during the regeneration of the methanol. This also allows for recovery of the sulfur present using downstream processes such as for example the Claus process.

Flash regeneration of the scrubbing medium laden with acidic gas constituents may be carried out in multistage fashion, wherein mechanical work and refrigeration can be recovered in the decompression. Thus, in a process for separation of acidic constituents such as $CO_2$, $H_2S$ and COS from a gas stream U.S. Pat. No. 5,067,972 proposes treating said stream with a physical scrubbing medium. The scrubbing medium laden with the acidic gas constituents is supplied to a cascade of flash vessels of incrementally decreasing pressure and the flash gases thus liberated are supplied between two stages of a multistage decompression turbine in each case. This recovers mechanical work and process refrigeration.

In order to perform especially the desorption of $CO_2$ from the laden scrubbing medium/absorbent as completely as possible it is customary to apply the scrubbing medium already partially regenerated by flash regeneration to a stripping column arranged downstream of the flash regeneration stages in whose lower part a stripping gas, for example nitrogen, is introduced and contacted with the scrubbing medium. This intensifies the mass transfer between the gas phase and the liquid phase and further proportions of $CO_2$ are desorbed from the scrubbing medium. However, this also results in undesired desorption of sulfur components bound in the scrubbing medium, for example of $H_2S$. This same phenomenon can also occur if a dedicated flash regeneration apparatus for $CO_2$-depletion of scrubbing medium laden with sulfur components is present.

In order to prevent/reverse undesired flashing of sulfur components the upper portion of the stripping column is configured as a reabsorber in which using a small amount of fresh, regenerated or partially regenerated scrubbing medium $H_2S$ is scrubbed out of the stripped-out gases and thus reabsorbed. The stripping column configured in this way is therefore also referred to as a reabsorber column. Also in the presence of a dedicated flash regeneration apparatus for $CO_2$-depletion of scrubbing medium laden with sulfur components unintentionally flashed-out sulfur components may be reabsorbed in analogous fashion, either by providing a dedicated reabsorption zone or by introducing the gas stream comprising the flashed-out sulfur components to the common reabsorber column.

Despite utilizing the flash gases to recover process refrigeration, the production thereof remains an important factor for the energy requirements of the stripping process. Energetic optimization through improved recovery or reclamation of process refrigeration would therefore be desirable.

SUMMARY

It is accordingly an object of the invention to specify a scrubbing process/purification process and a plant suitable therefor which provides energetic optimization through improved recovery or reclamation of process refrigeration.

The term scrubbing medium, synonymous with absorption medium or solvent, is in the context of the present invention to be understood as meaning substances or substance mixtures which under process conditions are in the form of a liquid, have an absorption capacity for the components to be separated from the gas and may be regenerated by physical methods, for example by flashing or by hot regeneration.

In the context of the present invention sulfur components are to be understood as meaning inorganic and organic, sulfur-containing components, in particular hydrogen sulfide $H_2S$, carbonyl sulfide COS, carbon disulfide $CS_2$ and the mercaptans RSH, wherein R represents an organic radical. Mercaptans whose radical R contains not less than five carbon atoms are referred to as heavy mercaptans. By contrast, mercaptans whose radical R contains not more than four carbon atoms are referred to as light mercaptans.

A physically acting scrubbing medium selective for sulfur components and/or carbon dioxide is to be understood as meaning a liquid substance or a liquid substance mixture whose dissolving power for sulfur components, expressed by the respective Henry constant, under particular process conditions, in particular pressure and temperature, is higher than for comparably structured and/or comparably heavy, sulfur-free components. The scrubbing power is based on the absorption of the corresponding components by uptake and distribution within the volume phase of the scrubbing medium but not on the formation of chemical bonds between the scrubbing medium and the component to be separated. Accordingly, physically acting scrubbing media are generally regenerable by pressure reduction and/or temperature elevation, wherein the previously absorbed components are recovered in chemically unchanged form.

Absorption apparatuses are often in the form of absorption columns. An absorption column, alternatively referred to for example as a gas scrubber, scrubbing column or scrubber, is a process engineering apparatus in which a gas stream is intensively contacted with a liquid stream to achieve uptake of constituents of the gas stream in the liquid. The configuration thereof aims to generate the largest possible liquid surface area for the best possible mass transfer between the gas and liquid phase. This may be effected by generating bubbles or droplets or by trickling onto solid surfaces. It is therefore usual to provide surface area-enlarging internals such as trays, for example sieve trays or bubble-cap trays, or structured packings; alternatively sections of the absorption column may be filled with random packings such as for example spheres, cylinders, rings or saddles. In terms of construction, absorption columns are usually configured as upright pipes, optionally by combination of pipe sections, which extend along a longitudinal axis running parallel to the vertical and which encompass an interior of the absorption column.

Different absorption zones in an absorption apparatus are often separated from one another in terms of construction. Thus, in an absorption column comprising a plurality of absorption zones these may be separated or delimited from one another by separating trays. A separating tray is to be understood as meaning internals of absorption columns, in particular specially configured column trays, which allow vapor or gas streams ascending in the column to pass through the separating tray while being impermeable to liquid streams downflowing/descending in the column, so that these collect on the separating tray and are withdrawn via a separate outlet (side takeoff) and thus discharged from the column. The separating tray is therefore also referred to as a takeoff tray or collecting tray. In a sense it forms a second column sump between the upper and the lower end of the column. A known configuration of a separating tray is that of a chimney tray.

A hot regeneration apparatus, in particular a hot regeneration column, is to be understood as meaning a process engineering apparatus which in terms of construction is similar to an absorption column but whose purpose is that of very largely freeing absorbent/scrubbing medium laden with gas components of said components and thus regenerating the scrubbing medium by desorption through introduction of heat. This is technically achieved for example by providing the hot regeneration column with a reboiler for heating the column sump, thus producing scrubbing medium intrinsic vapor which serves as an expulsion, desorption and stripping medium and thus promotes desorption of the gas components.

Enrichment or depletion of a component in a mixture, a fraction or a material stream is to be understood as meaning a measure, operation or process step which has the result that the mole fraction or mass fraction of this component increases (enrichment) or decreases (depletion).

The predominant portion of a fraction, of a material stream, etc. is to be understood as meaning a proportion quantitatively greater than all other proportions each considered alone. Especially in the case of binary mixtures or in the case of resolving a fraction into two parts this is to be understood as meaning a proportion of more than 50% by weight unless otherwise stated in the specific case.

The indication that a material stream consists predominantly of one component or group of components is to be understood as meaning that the mole fraction or mass fraction of this component or component group is quantitatively greater than all other proportions of other components or component groups in the material stream each considered alone. Especially in the case of binary mixtures this is to be understood as meaning a proportion of more than 50%. Unless otherwise stated in the specific case this is based on the mass fraction.

In the context of the present invention a division or resolution/separation of a material stream is to be understood as meaning production of at least two substreams from the original material stream, wherein resolution/separation is associated with an intentional alteration of the composition of matter of the obtained substreams with respect to the original material stream, for example through application of a thermal separation process to the original material stream. By contrast, division of the original material stream is generally not associated with a change in the composition of matter of the obtained substreams.

Flashing or flash regeneration is to be understood as meaning a rapid, preferably abrupt, decompression of a liquid, for example an adsorbent or scrubbing medium laden with disruptive components, which is preferably effected upon entering a vessel via a flow limiter, for example a valve. The gases thus liberated are referred to as flash gases. In practice, flash regeneration apparatuses are often configured in multistage fashion as a cascade of two or more liquid separators arranged in series and configured for example with an integrated or separate liquid separator and having incrementally decreasing pressures. In addition, the scrubbing media laden with different disruptive components are often treated in separate flash regeneration apparatuses, for example in a flash regeneration apparatus for scrubbing medium laden only with carbon dioxide (hereinafter second flash regeneration apparatus) and a separate flash regeneration apparatus for scrubbing medium laden with carbon dioxide and also sulfur components (hereinafter first flash regeneration apparatus). The operating conditions of such flash regeneration apparatuses are known to those skilled in the art or may be determined in the specific application through routine experiments or art-specific calculations (for example through process simulation).

The indication that a raw synthesis gas stream in an absorption apparatus passes through initially at least one sulfur components absorption zone and subsequently at least one carbon dioxide absorption zone does not preclude the possibility that it has previously passed through a further absorption zone arranged upstream of the sulfur components absorption zone as a prescrubbing stage, whose purpose it is with a further small subamount of the scrubbing medium for example to remove under specific conditions further disruptive components, for example hydrogen cyanide (HCN) and aliphatic and aromatic hydrocarbons, for example BTX aromatics (benzene, toluene, xylenes) or naphtha. The specific operating conditions necessary therefor are likewise known to those skilled in the art and may be determined by them through routine experiments or art-specific calculations (for example through process simulation). Regeneration of the scrubbing medium laden in a prescrubbing with the recited further disruptive components is effected for example by hot regeneration.

Fluid connection between two regions is to be understood as meaning any type of connection whatsoever which makes it possible that a fluid, for example the liquid scrubbing medium, can flow from the one to the other of the two regions, neglecting any interposed regions, component parts, valves or apparatuses.

Means for providing, supplying or discharging material streams to or from process stages or plant parts are to be understood as meaning all apparatuses, component parts and devices which a person skilled in the art would consider utilizing in the particular situation, in particular reservoir vessels, conduits, isolating and metering apparatuses such as for example valves, conveying apparatuses such as for example pumps, blowers, compressors.

Any pressure figures in the unit bar (a) are based on the absolute pressure in bar, absolute, unless stated otherwise in the individual case.

The invention is based on the finding that by dividing the overall stripping gas stream into a preferably predominant portion passed to the reabsorber column and a residual proportion passed to the multistage second flash regeneration apparatus, in particular to the last flash stage, the recovery of process refrigeration may be enhanced, thus improving the energy efficiency of the process/the plant. In addition, the desorption of carbon dioxide from the laden scrubbing medium is improved even upstream of the reabsorber column, thus allowing said column to be made smaller.

A second aspect of the process according to the invention is characterized in that the second portion of the stripping gas is introduced to the furthest downstream flash stage of the multistage second flash regeneration apparatus. This last flash stage and the subsequent downstream reabsorber column are at the same or an only slightly different pressure level, so that the second portion of the stripping gas which is introduced to the flash regeneration apparatus need not be compressed and the offgases from the reabsorber column and the last flash stage, both of which contain carbon dioxide and stripping gas, for example nitrogen, may be simply combined and discharged. They may then be supplied for example to a final offgas purification apparatus, for example a separate gas scrubbing, and therein freed from harmful substances before being discharged to the environment. For example traces of a methanol scrubbing medium may be removed from the offgas by water scrubbing before the offgas is discharged to the environment. The separated methanol may optionally be reused as a portion of the scrubbing medium after purification.

A third aspect of the process according to the invention is characterized in that the top product stream discharged from the last flash stage of the multistage second flash regeneration apparatus and/or the top product stream discharged from the reabsorber column, both of which contain carbon dioxide and stripping gas, may be used as a constituent of the first cooling medium. Both gas streams are cold; the flash gas thus has a temperature in a multistage flash regeneration apparatus in the first stage of for example −20° C. and in the last stage even of for example −60° C. Both gas streams may therefore be advantageously employed as a constituent of the first cooling medium. Through combination of the two gas streams the volume flow of the cooling medium is increased, thus improving the heat transfer in the corresponding heat exchangers. Alternatively or in addition one or both of the recited gas streams may also be used as cooling medium at a different point in the process or the plant, for example for cooling the hot-regenerated scrubbing medium.

A fourth aspect of the process according to the invention is characterized in that the carbon dioxide-containing gas stream discharged from the first flash stage of the multistage second flash regeneration apparatus is recycled to the absorption apparatus. In this way target components such as hydrogen or carbon monoxide still present in this gas stream may be recovered and thus the material thereof utilized. The recycling of the gas stream from the first flash stage is particularly advantageous since the pressure level here is still higher than in the subsequent pressure stages and the compression cost and complexity before recycling to the absorption apparatus is thus comparatively low.

A fifth aspect of the process according to the invention is characterized in that the second flash regeneration apparatus comprises at least three flash stages, wherein a carbon dioxide-containing gas stream is discharged as a carbon dioxide product stream from a middle flash stage. A carbon dioxide-containing gas stream is obtained in particular purity in a middle flash stage since target components such as hydrogen or carbon monoxide have already been flashed out at higher pressure in an upstream flash stage while on the other hand the pressure in a middle flash stage is still high enough not to flash out any sulfur components which would reduce the purity of the carbon dioxide product stream.

A sixth aspect of the process according to the invention is characterized in that all gas streams discharged from the multistage second flash regeneration apparatus are used as constituents of the first cooling medium. This makes it possible to recover or reclaim process refrigeration to a particularly large extent, thus particularly markedly reducing the energy consumption of the process or the plant. Alternatively or in addition these gas streams may also be used as cooling medium at a different point in the process or the plant, for example for cooling the hot-regenerated scrubbing medium.

A seventh aspect of the process according to the invention is characterized in that the second flash regeneration apparatus comprises at least three flash stages, wherein the pressure in the first flash stage is between 5 and 30 bar(a), the pressure in a middle flash stage is between 2.5 and 5.0 bar(a) and the pressure in the last flash stage is between 1.5 and 2.5 bar(a). Investigations have shown that when observing these pressure ranges the flash gas from the first flash stage may be particularly advantageously recycled to the absorption apparatus and a particularly pure carbon dioxide product stream is obtained from a middle flash stage and the gas stream from the last flash stage may be particularly effectively employed as a cooling medium constituent.

An eighth aspect of the process according to the invention is characterized in that the second portion of the stripping gas is not more than 20% by volume, preferably not more than 10% by volume, most preferably not more than 5% by volume of the total stripping gas used in the process. This enhances the desorption of carbon dioxide and the recovery of process refrigeration but the comparatively small amount of the second portion of the stripping gas prevents undesired desorption of sulfur components.

A further aspect of the plant according to the invention is characterized in that said plant further comprises means which allow the second portion of the stripping gas to be introduced to the furthest downstream flash stage of the multistage second flash regeneration apparatus. The advantages of this aspect of the plant according to the invention correspond to those described in connection with the second aspect of the process according to the invention.

A further aspect of the plant according to the invention is characterized in that said plant further comprises means which allow the top product stream discharged from the last flash stage of the multistage second flash regeneration apparatus and/or the top product stream discharged from the reabsorber column, both of which contain carbon dioxide and stripping gas, to be used as a constituent of the first cooling medium. The advantages of this aspect of the plant according to the invention correspond to those described in connection with the third aspect of the process according to the invention. Alternatively or in addition the plant may also comprise means which allow these gas streams to be used as a cooling medium at a different point in the process or the plant, for example for cooling the hot-regenerated scrubbing medium.

A further aspect of the plant according to the invention is characterized in that said plant further comprises means which allow the carbon dioxide-containing gas stream discharged from the first flash stage of the multistage second flash regeneration apparatus to be recycled to the absorption apparatus. The advantages of this aspect of the plant according to the invention correspond to those described in connection with the fourth aspect of the process according to the invention.

A further aspect of the plant according to the invention is characterized in that the second flash regeneration apparatus comprises at least three flash stages, wherein said plant comprises means which allow a carbon dioxide-containing gas stream to be discharged as a carbon dioxide product stream from a middle flash stage. The advantages of this aspect of the plant according to the invention correspond to those described in connection with the fifth aspect of the process according to the invention.

A further aspect of the plant according to the invention is characterized in that said plant further comprises means which allow all gas streams discharged from the multistage second flash regeneration apparatus to be used as constituents of the first cooling medium. The advantages of this aspect of the plant according to the invention correspond to those described in connection with the sixth aspect of the process according to the invention. Alternatively or in addition the plant may also comprise means which allow these gas streams to be used as a cooling medium at a different point in the process or the plant, for example for cooling the hot-regenerated scrubbing medium.

BRIEF DESCRIPTION OF THE DRAWINGS

Further features, advantages and possible applications of the invention are also apparent from the following description of exemplary examples and the drawings. All the features described and/or depicted, on their own or in any combination, form the subject-matter of the invention, irrespective of their composition in the claims or their dependency references.

In the figures.

DETAILED DESCRIPTION OF PREFERRED EMBODIMENTS

Figure 1:
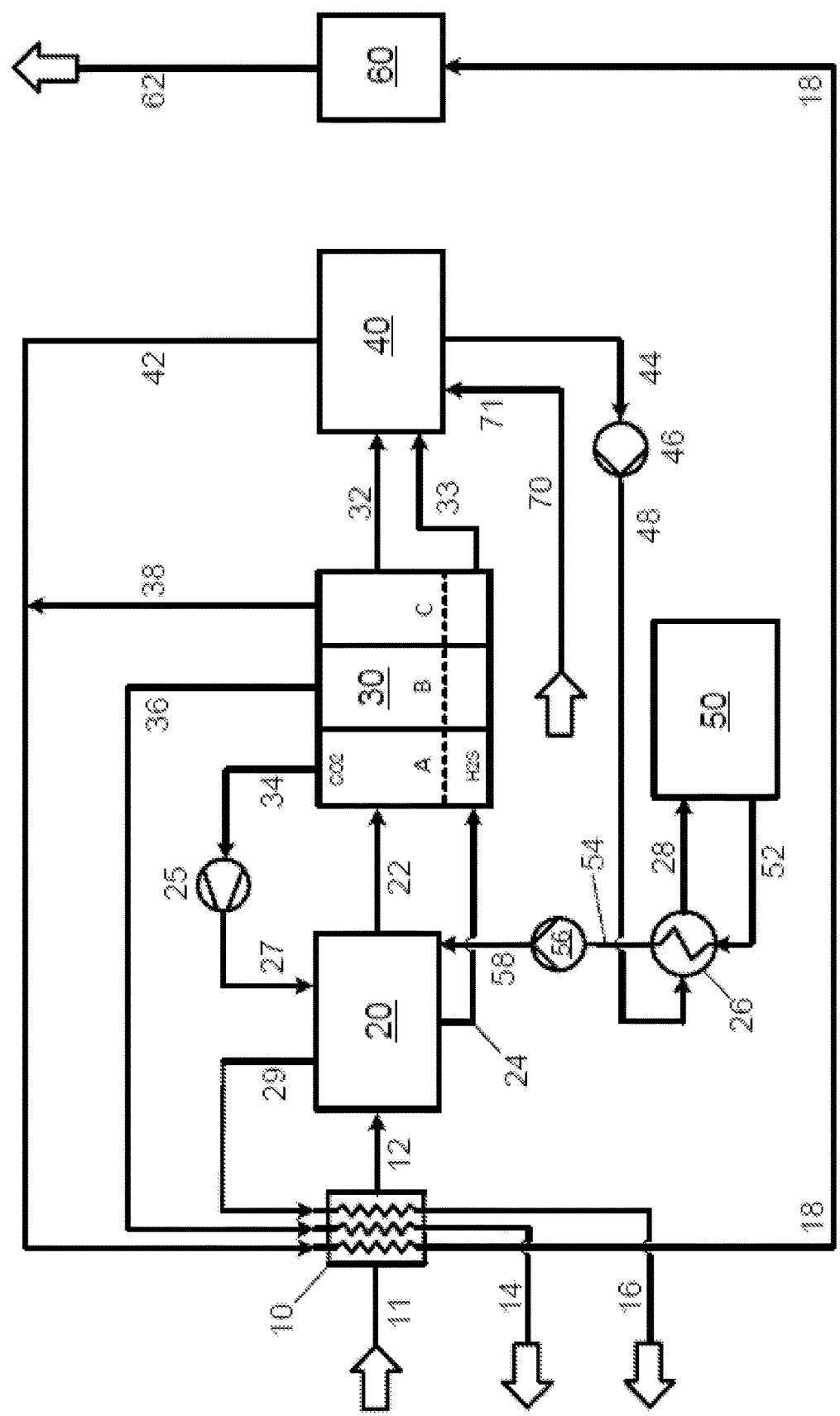
FIG. 1 shows a schematic representation of the process according to the invention of the plant according to the invention according to the prior art.

In the schematic representation of the process/of the plant according to the prior art shown in FIG. 1 conduit 11 supplies a raw synthesis gas stream to be purified which contains hydrogen and carbon monoxide as target components and carbon dioxide and sulfur components as disruptive components. After cooling in a heat exchanger 10 in indirect heat exchange against two or more material streams serving as cooling media the raw synthesis gas stream is supplied via conduit 12 to an absorption apparatus 20 and introduced thereto, The absorption apparatus is in the form of an absorption column and divided by a separating tray (not shown) into two absorption zones each provided with surface area-enlarging internals such as trays, structured packings or random packings, wherein in the gas flow direction of the raw synthesis gas initially at least one sulfur components absorption zone arranged in the lower portion of the absorption column and subsequently at least one carbon dioxide absorption zone arranged in the upper portion of the absorption column is traversed (both not shown).

The sulfur components absorption zone may optionally have arranged upstream of it as a prescrubbing stage a further upstream absorption zone (not depicted) whose purpose it is with a further, for example small, subamount of the scrubbing medium to remove under specific conditions further disruptive components, for example hydrogen cyanide (HCN) and aliphatic and aromatic hydrocarbons, for example BTX aromatics (benzene, toluene, xylenes) or naphtha. The specific operating conditions necessary therefor are known to the person skilled in the art or may be determined by them through routine experiments or art-specific calculations (for example through process simulation).

All absorption zones are supplied with fresh, regenerated or partially regenerated methanol as scrubbing medium. The recycling of regenerated methanol from a hot regeneration apparatus 50 is indicated by conduit 58; in practice fresh, regenerated or partially regenerated methanol is added at a plurality of addition points distributed over the height of the absorption column. The absorption apparatus further comprises a cooling apparatus (not depicted) which ensures the desired low temperature of the scrubbing medium of for example −35° C. and colder.

In the absorption apparatus the raw synthesis gas stream supplied via conduit 12 is initially contacted with a methanol substream as a first scrubbing medium stream in a sulfur components absorption zone under sulfur components absorption conditions. A synthesis gas stream depleted in sulfur components is then discharged from the sulfur components absorption zone. A scrubbing medium stream enriched in sulfur components is also discharged from the sulfur components absorption zone via conduit 24 and supplied to a first flash regeneration apparatus which comprises for example three flash stages of incrementally decreasing pressure.

The first flash regeneration apparatus for separating carbon dioxide from the scrubbing medium containing sulfur components and the second flash regeneration apparatus for separating carbon dioxide from the carbon dioxide-laden scrubbing medium described hereinbelow are in the figures represented in simplified form as the function block having reference numeral 30, wherein the separation of the two regions is indicated by a horizontal dashed line which separates the second flash regeneration apparatus (upper region) from the first flash regeneration apparatus (lower region). In practice, the two flash regeneration apparatuses are for example configured in multistage fashion as a cascade of two or more liquid separators arranged in series and configured for example with an integrated or separate liquid separator and having incrementally decreasing pressures. The general operating conditions to be used in the flash regeneration apparatuses are known to the person skilled in the art or in a specific application may be determined by them through routine experiments or art-specific calculations (for example through process simulation).

Via conduit 33 a third scrubbing medium stream containing sulfur components and depleted in carbon dioxide by flashing is discharged from the first flash regeneration apparatus and supplied to a stripping column (reabsorber column) 40 and introduced thereto.

The synthesis gas stream depleted in sulfur components discharged from the sulfur components absorption zone is introduced to a carbon dioxide absorption zone which when the absorption apparatus is in the form of an absorption column is usually arranged in the upper portion thereof and separated from the sulfur components absorption zone by a separating tray, for example a chimney tray. In the carbon dioxide absorption zone the synthesis gas stream depleted in sulfur components is under carbon dioxide absorption conditions contacted with a second scrubbing medium stream obtained for example as a substream from the hot-regenerated methanol supplied via conduit 58. A synthesis gas stream depleted in carbon dioxide is then discharged from the carbon dioxide absorption zone via conduit 29, serves as cooling medium in the subsequent heat exchanger 10 and is thus heated in indirect heat exchange against supplied raw synthesis gas. The synthesis gas stream heated in this way is then discharged from the process/the plant as pure synthesis gas stream via conduit 16.

Via conduit 22 a scrubbing medium stream enriched in carbon dioxide is discharged from the absorption apparatus and sent to a multistage second flash regeneration apparatus (part of the function block having reference numeral 30 above the dashed line) which in the present exemplary embodiment is in the form of three flash stages A, B, C, wherein the pressures in the individual flash stages decrease in the flow direction of the scrubbing medium stream. In one example the pressure in the first flash stage is between 5 and 30 bar(a). In a further example the pressure in a middle flash stage is between 2.5 and 5.0 bar(a). In a further example the pressure in the last flash stage is between 1.5 and 2.5 bar(a). In a further example the pressure in the first flash stage is between 5 and 30 bar(a), the pressure in a middle flash stage is between 2.5 and 5.0 bar(a) and the pressure in the last flash stage is between 1.5 and 2.5 bar(a).

In the first flash stage A of the multistage second flash regeneration apparatus a flash gas still containing significant proportions of hydrogen and carbon monoxide as target components is recovered. In order to recover said components and achieve material utilization of the flash gas this flash gas stream is via conduit 34, compressor 25 and conduit 27 recycled to the absorption apparatus and introduced thereto.

In the second flash stage B of the multistage second flash regeneration apparatus a flash gas containing carbon dioxide in high purity is recovered. The corresponding flash gas stream is therefore discharged as carbon dioxide product stream via conduit 36, heat exchanger 10 and conduit 14. Since said stream is cold it too is utilized as cooling medium in the heat exchanger 10 to cool the supplied raw synthesis gas stream in indirect heat exchange.

The carbon dioxide-containing flash gas stream obtained in the third flash stage C of the multistage second flash regeneration apparatus is supplied via conduit 38, conduit 42, heat exchanger 10 and conduit 18 to an offgas purification apparatus 60, therein freed from harmful substances for example through gas scrubbing and/or adsorption and then discharged to the environment via conduit 62. For example traces of a methanol scrubbing medium may be removed from the offgas by water scrubbing before the offgas is discharged to the environment. The separated methanol may optionally be reused as a portion of the scrubbing medium after purification.

In order to perform especially the desorption of $CO_2$ from the laden scrubbing medium/absorbent as completely as possible also the fourth scrubbing medium stream discharged from the second flash regeneration apparatus, depleted in carbon dioxide and thus already partially regenerated is applied via conduit 32 to the stripping column (reabsorber column) 40 in whose lower portion a stripping gas, for example nitrogen, is introduced via conduits 70 and 71 and contacted with the scrubbing medium. This intensifies the mass transfer between the gas phase and the liquid phase and further proportions of $CO_2$ are desorbed from the scrubbing medium. However, this also results in undesired desorption of sulfur components still bound in the scrubbing medium, for example of $H_2S$. In order to prevent/reverse this the upper portion of the stripping column is configured as a reabsorber in which using a small amount of fresh, regenerated or partially regenerated scrubbing medium $H_2S$ is scrubbed out of the stripped-out gases and thus reabsorbed (not depicted). The stripping column configured in this way is therefore also referred to as a reabsorber column.

From the column top of the reabsorber column a gaseous top product stream containing carbon dioxide and the stripping gas is discharged via conduit 42. Said stream is via heat exchanger 10 and conduit 18 likewise supplied to the offgas purification apparatus 60, therein freed from harmful substances for example by gas scrubbing and/or adsorption and then discharged to the environment via conduit 62. This is preferably effected together with the offgas stream discharged from the flash regeneration apparatus via conduit 38.

Obtained in the column sump of the reabsorber column is a liquid scrubbing medium stream laden with sulfur components which is passed via conduit 44, pump 46, conduit 48, heat exchanger 26 and conduit 28 to a hot regeneration apparatus 50 and introduced thereto. Heat exchanger 26 effects a preheating of the liquid scrubbing medium stream laden with sulfur components in indirect heat exchange against the hot-regenerated methanol scrubbing medium discharged from the hot regeneration apparatus 50 which is thus cooled.

In the hot regeneration apparatus 50 the laden methanol scrubbing medium is treated under hot regeneration conditions known to those skilled in the art to obtain regenerated methanol scrubbing medium which via conduit 52 is discharged from the hot regeneration apparatus and via heat exchanger 26, conduit 54, pump 56 and conduit 58 recycled to the absorption apparatus. The hot regeneration apparatus further affords a gas stream laden with sulfur components such as $H_2S$, COS or mercaptans which is discharged from the hot regeneration apparatus via a conduit (not shown). It may be supplied for example to a plant (not depicted) for sulfur recovery by the Claus process or another sulfur recovery process.

Figure 2:
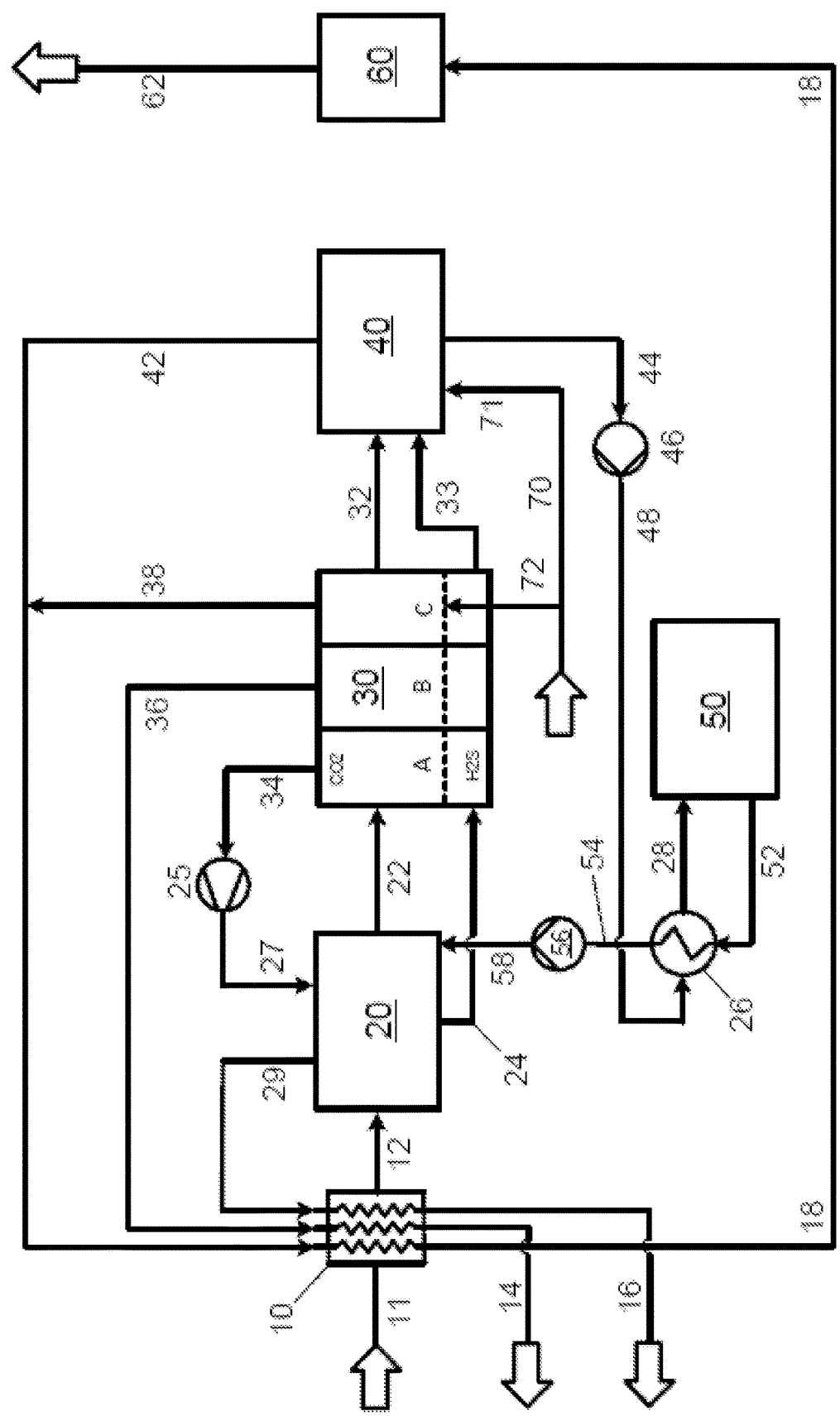
FIG. 2 shows a schematic representation of the process according to the invention/of the plant according to the invention according to a particular embodiment.

FIG. 2 shows a schematic representation of the process according to the invention/the plant according to the invention in a particular embodiment which in its particulars corresponds to that described in connection with FIG. 1. However, according to the invention now only a first portion of the stripping gas stream supplied via conduit 70 is introduced to the reabsorber column via conduit 71 while a second portion of the stripping gas is introduced to the multistage second flash regeneration apparatus via conduit 72. By dividing the overall stripping gas stream into a preferably predominant portion passed to the reabsorber column and a residual proportion passed to the multi-stage second flash regeneration apparatus, in particular to the last flash stage, the recovery of process refrigeration may be enhanced, thus improving the energy efficiency of the process/the plant. In addition, the desorption of carbon dioxide from the laden scrubbing medium is improved even upstream of the reabsorber column, thus optionally allowing said column to be made smaller.

In a further embodiment of the invention (not shown) one, more or all of the cold flash gas streams obtained in the flash regeneration apparatus are utilized as cooling medium by means of additional heat exchangers for cooling the regenerated scrubbing medium recycled to the absorption apparatus via conduit 58.

Numerical Example

The plant operation of a plant for purifying raw synthesis gas was altered such that, of the nitrogen stripping gas stream previously (comparative example) supplied to the reabsorber column to an extent of 100%, according to the invention 5 vol % was now supplied to the last flash stage of the three-stage flash regeneration apparatus and the remaining proportion of 95 vol % was supplied to the reabsorber column. The cold flash gases were supplied to a heat exchanger 10 according to FIG. 1 and FIG. 2 and the recovered process refrigeration was used for cooling the introduced raw synthesis gas. This made it possible to save around 2% of the refrigeration power relative to the comparative example. Furthermore, the carbon dioxide content in the pure synthesis gas was reduced from 14 ppmv (comparative example) to 10 ppmv (invention).

LIST OF REFERENCE NUMERALS

[10] Heat exchanger
[11] Conduit
[12] Conduit
[14] Conduit
[16] Conduit
[18] Conduit
[20] Absorption apparatus (Absorption column)
[22] Conduit
[24] Conduit
[25] Compressor
[26] Heat exchanger
[27] Conduit
[28] Conduit
[29] Conduit
[30] Flash regeneration apparatus comprising stages A, B, C Lower region (H2S): first flash regeneration apparatus Upper region (CO2): second flash regeneration apparatus
[32] Conduit
[33] Conduit
[34] Conduit
[36] Conduit
[38] Conduit
[40] Stripping column, reabsorber column
[42] Conduit
[44] Conduit
[46] Pump
[48] Conduit
[50] Hot regeneration apparatus
[52] Conduit
[54] Conduit
[56] Pump
[58] Conduit
[60] Offgas purification apparatus
[62] Conduit
[70] Conduit
[71] Conduit
[72] Conduit It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for purifying a raw synthesis gas containing hydrogen and carbon monoxide as target components and carbon dioxide and sulfur components as disruptive components by gas scrubbing with a physically acting, liquid scrubbing medium selective for carbon dioxide and sulfur components comprising the steps of:
   a) providing an absorption apparatus comprising at least two absorption zones each provided with surface area-increasing internals, wherein in the gas flow direction of raw synthesis gas first passes through an absorption zone to remove at least one sulfur component and subsequently passes through an absorption zone to remove at least one carbon dioxide component
   b) providing the raw synthesis gas stream to be purified, cooling the raw synthesis gas stream through indirect heat exchange with a first cooling medium, introducing the cooled raw synthesis gas stream to the at least absorption zone for removing at least one sulfur component,
   c) contacting the cooled raw synthesis gas stream in the at least one sulfur components absorption zone under sulfur components absorption conditions with a first scrubbing medium stream, discharging a synthesis gas stream depleted in sulfur components from the at least one sulfur components absorption zone, discharging a scrubbing medium stream enriched in sulfur components from the at least one sulfur components absorption zone, introducing the synthesis gas stream depleted in sulfur components to the at least one carbon dioxide absorption zone, d) contacting the synthesis gas stream depleted in sulfur components in the at least one carbon dioxide absorption zone under carbon dioxide absorption conditions with a second scrubbing medium stream, discharging a synthesis gas stream depleted in carbon dioxide from the at least one carbon dioxide absorption zone as pure synthesis gas, discharging a scrubbing medium stream enriched in carbon dioxide from the at least one carbon dioxide absorption zone, e) supplying the scrubbing medium stream enriched in sulfur components to a first flash regeneration apparatus, discharging a third scrubbing medium stream containing sulfur components and depleted in carbon dioxide by flashing and at least one first carbon dioxide-containing gas stream from the first flash regeneration apparatus, f) discharging at least one first carbon dioxide-containing gas stream from the absorption apparatus, introducing it to a multistage second flash regeneration apparatus, wherein the pressures in the individual flash stages decrease in the flow direction of the scrubbing medium stream, discharging a fourth scrubbing medium stream depleted in carbon dioxide through multistage flashing and at least one second carbon dioxide-containing gas stream from the second flash regeneration apparatus, g) introducing the third and the fourth scrubbing medium stream into a reabsorber column, stripping the third scrubbing medium stream or the third and the fourth scrubbing medium stream in the reabsorber column with a first portion of a stripping gas, discharging a gaseous top product stream comprising carbon dioxide and stripping gas from the reabsorber column, discharging a liquid sump product stream from the reabsorber column, supplying the sump product stream to a hot regeneration apparatus and introducing it thereto, h) hot regenerating the sump product stream from the reabsorber column in the hot regeneration apparatus under hot regeneration conditions, discharging a product gas stream enriched in sulfur components and a fifth scrubbing medium stream depleted in sulfur components from the hot regeneration apparatus, recycling at least a portion of the fifth scrubbing medium stream after cooling as a constituent of the first and/or second scrubbing medium stream to the absorption apparatus, wherein, i) a second portion of the stripping gas is introduced to the multistage second flash regeneration apparatus and an offgas stream comprising carbon dioxide and stripping gas is discharged therefrom.

2. The process according to claim 1, wherein the second portion of the stripping gas is introduced to the furthest downstream flash stage of the multistage second flash regeneration apparatus.

3. The process according to claim 1, wherein the top product stream discharged from the last flash stage of the multistage second flash regeneration apparatus and/or the top product stream discharged from the reabsorber column, both of which contain carbon dioxide and stripping gas, are used as a constituent of the first cooling medium.

4. The process according to claim 1, wherein the carbon dioxide-containing gas stream discharged from the first flash stage of the multistage second flash regeneration apparatus is recycled to the absorption apparatus.

5. The process according to claim 1, wherein the second flash regeneration apparatus comprises at least three flash stages, wherein a carbon dioxide-containing gas stream is discharged as a carbon dioxide product stream from a middle flash stage.

6. The process according to claim 1, wherein all gas streams discharged from the multistage second flash regeneration apparatus are used as constituents of the first cooling medium.

7. The process according to claim 1, wherein the second flash regeneration apparatus comprises at least three flash stages, wherein the pressure in the first flash stage is between 5 and 30 bar(a), the pressure in a middle flash stage is between 2.5 and 5.0 bar(a) and the pressure in the last flash stage is between 1.5 and 2.5 bar(a).

8. The process according to claim 1, wherein the second portion of the stripping gas is not more than 20% by volume of the total stripping gas used in the process.

9. A plant for purifying a raw synthesis gas containing hydrogen and carbon monoxide as target components and carbon dioxide and sulfur components as disruptive components by gas scrubbing with a physically acting, liquid scrubbing medium selective for carbon dioxide and sulfur components comprising the following assemblies and constituents in fluid connection with one another:

a) an absorption apparatus comprising at least two absorption zones each provided with surface area-increasing, configured such that in the gas flow direction of the raw synthesis gas initially at least one first absorption zone configured to remove at least one sulfur component and subsequently at least one second absorption zone configured to remove at least one carbon dioxide component is traversed, b) a means for providing the raw synthesis gas stream to be purified, a means for cooling the raw synthesis gas stream through indirect heat exchange with a first cooling medium, a means for introducing the cooled raw synthesis gas stream to the at least one sulfur components absorption zone, c) a means for contacting the cooled raw synthesis gas stream in the at least one sulfur components absorption zone with a first scrubbing medium stream, a means for discharging a synthesis gas stream depleted in sulfur components from the at least one sulfur components absorption zone, a means for discharging a scrubbing medium stream enriched in sulfur components from the at least one sulfur components absorption zone, a means for introducing the synthesis gas stream depleted in sulfur components to the at least one carbon dioxide absorption zone, ( ) a means for contacting the synthesis gas stream depleted in sulfur components in the at least one carbon dioxide absorption zone with a second scrubbing medium stream, a means for discharging a synthesis gas stream depleted in carbon dioxide from the at least one carbon dioxide absorption zone as pure synthesis gas, a means for discharging a scrubbing medium stream enriched in carbon dioxide from the at least one carbon dioxide absorption zone, e) a first flash regeneration apparatus, a means for supplying the scrubbing medium stream enriched in sulfur components to the first flash regeneration apparatus, a means for discharging a third scrubbing medium stream containing sulfur components and depleted in carbon dioxide by flashing and at least one first carbon dioxide-containing gas stream from the first flash regeneration apparatus, f) a multistage second flash regeneration apparatus configured such that the pressures in the individual flash stages decrease in the flow direction of the scrubbing medium stream, a means for discharging at least one first carbon dioxide-containing gas stream enriched in carbon dioxide from the absorption apparatus, a means for introducing it to the multistage second flash regeneration apparatus, a means for discharging a fourth scrubbing medium stream depleted in carbon dioxide through multistage flashing and at least one second carbon dioxide-containing gas stream from the second flash regeneration apparatus, g) a reabsorber column, a means for introducing the third and the fourth scrubbing medium stream into the reabsorber column, a means for supplying a first portion of a stripping gas to the reabsorber column, a means for discharging a gaseous top product stream comprising carbon dioxide and stripping gas from the reabsorber column, a hot regeneration apparatus, a means for discharging a liquid sump product stream from the reabsorber column and a means for supplying the sump product stream to a hot regeneration apparatus and introducing it thereto, h) a means for discharging a product gas stream enriched in sulfur components and a fifth scrubbing medium stream depleted in sulfur components from the hot regeneration apparatus, a means for recycling at least a portion of the fifth scrubbing medium stream after cooling as a constituent of the first and/or second scrubbing medium stream to the absorption apparatus, wherein, i) said plant comprises a means which allow a second portion of the stripping gas to be introduced to the multistage second flash regeneration apparatus and an offgas stream comprising carbon dioxide and stripping gas to be discharged therefrom.

10. The plant according to claim 9, further comprising a means which allow the second portion of the stripping gas to be introduced to the furthest downstream flash stage of the multistage second flash regeneration apparatus.

11. The plant according to claim 9, further comprising a means which allow the top product stream discharged from the last flash stage of the multistage second flash regeneration apparatus and/or the top product stream discharged from the reabsorber column, both of which contain carbon dioxide and stripping gas, to be used as a constituent of the first cooling medium.

12. The plant according to claim 9, further comprising a means which allow the carbon dioxide-containing gas stream discharged from the first flash stage of the multistage second flash regeneration apparatus to be recycled to the absorption apparatus.

13. The plant according to claim 9, wherein the second flash regeneration apparatus comprises at least three flash stages, wherein said plant comprises means which allow a carbon dioxide-containing gas stream to be discharged as a carbon dioxide product stream from a middle flash stage.

14. The plant according claim 9, further comprising a means which allow all gas streams discharged from the multistage second flash regeneration apparatus to be used as constituents of the first cooling medium.

* * * * *